United States Patent [19]

Krishnakumar et al.

[11] 4,334,627
[45] Jun. 15, 1982

[54] BLOW MOLDED PLASTIC BOTTLE

[75] Inventors: Suppayan M. Krishnakumar, Nashua, N.H.; John F. E. Pocock, Neu-Isenburg, Fed. Rep. of Germany

[73] Assignee: The Continental Group, Inc., New York, N.Y.

[21] Appl. No.: 247,044

[22] Filed: Mar. 24, 1981

Related U.S. Application Data

[63] Continuation of Ser. No. 97,605, Nov. 27, 1979, Pat. No. 4,261,948.

[51] Int. Cl.³ .............................................. B65D 1/02
[52] U.S. Cl. ........................................ 215/1 C; 220/70
[58] Field of Search .......................... 215/1 C; 220/70

[56] References Cited

U.S. PATENT DOCUMENTS

| | | | |
|---|---|---|---|
| 2,787,397 | 4/1957 | Radford | 215/1 C X |
| 3,029,963 | 4/1962 | Evers | 215/1 C |
| 3,137,748 | 6/1964 | Makowski | 215/1 C X |
| 3,643,829 | 2/1972 | Lachner | 215/1 C |
| 3,881,621 | 5/1975 | Adomaitis | 215/12 R X |
| 4,134,510 | 1/1979 | Chang | 215/1 C |
| 4,170,622 | 10/1979 | Uhlig | 264/534 X |

FOREIGN PATENT DOCUMENTS 1114304  5/1968  United Kingdom ............... 215/1 C Primary Examiner—Donald F. Norton
Attorney, Agent, or Firm—Charles E. Brown

[57] ABSTRACT

This disclosure relates to an unexpected increase in the strength of a bottle bottom of the champagne type by the addition of ribs internally of the preform when the preform is axially stretched prior to the blowing thereof within the blow mold. Most particularly, by adding internal ribs to the interior surface of the bottom defining portion of the preform, the preform has the bottom forming portion unduly strengthened against shrinkage in wall thickness when the preform is axially lengthened through the use of a stretch rod. The net result is that the stretching of the preform and the thinning of the wall is held to a minimum in the bottom forming portion of the preform and is transferred primarily to the body forming portion of the preform where lesser wall thickness does not unduly detract from the strength of the bottle.

5 Claims, 4 Drawing Figures

BLOW MOLDED PLASTIC BOTTLE

This application is a continuation of our copending application Ser. No. 97,605, filed Nov. 27, 1979, now U.S. Pat. No. 4,261,948, granted Apr. 14, 1981.

This invention relates in general to new and useful improvements in blown plastic material containers, and more particularly to a container having a champagne bottle bottom configuration. Most particularly, this invention relates to a plastic container of the general type disclosed in the U.S. patent to Adomaitis U.S. Pat. No. 3,881,621, granted May 6, 1975.

In the construction of containers such as bottles formed of plastic material, the weakest part continues to be the bottom of the container. When bottles are formed with champagne bottoms of plastic material and are filled with a beverage under pressure, there is an undue tensile stress on the bottom which has a tendency to invert the dome-like center of the bottom. While the above-mentioned patent to Adomaitis has strengthened the bottom in the junction ring area, there is still insufficient material in the bottom to resist deformation. Numerous attempts have been made to strengthen the bottom, but all of these attempts primarily require much more plastic material than is economically feasible.

In accordance with this invention, in lieu of the continuous reinforcing rib proposed by the Adomaitis patent, it is proposed to provide the bottom with a plurality of radiating shallow ribs in the form of added material on the inner surface of the bottom structure. These ribs extend across the junction ring and terminate in the lower section of the side wall of the bottle.

It has been determined that an unobvious advantage is obtained through the provision of these ribs. The ribs are produced by forming the usual preform for the bottle with axially extending ribs on the inner surface of the preform, the ribs terminating in the hemispherical bottom of the preform and extending axially upwardly so as to be included in substantially all of the preform which forms the bottom structure of the bottle.

An additional advantage is obtained when the preform is initially longitudinally stretched by means of a stretch rod prior to the blowing of the preform within the associated mold. It has been found that the forming of the bottom structure of the preform with the axial ribs strengthens the bottom portion to the extent that when the preform is initially stretched to lengthen the preform, in lieu of the bottom structure thinning in the same amount as does the intermediate portion of the preform which forms the bottle body, the bottom structure is stiffened by the ribs and is stretched only a minimum with the stretching occurring primarily in the intermediate portion of the preform. Since the bottom portion of the preform is not stretched, two advantageous features occur. First, the body of the preform is thinned which is permissible as far as the central strength of the resultant bottle body is concerned. Secondly, since the bottom portion of the preform is not axially stretched, the bottom of the resultant bottle has the added material therein which is normally removed by stretching. The net result is that by the provision of a small quantity of additional plastic material for the ribs, many times the weight of that material is retained within the bottom structure of the preform and thereby the bottom of the bottle is strengthened without the addition of a relatively large amount of plastic material in the preform.

With the above and other objects in view that will hereinafter appear, the nature of the invention will be more clearly understood by reference to the following detailed description, the appended claims, and the several views illustrated in the accompanying drawings.

IN THE DRAWINGS

Figure 1:
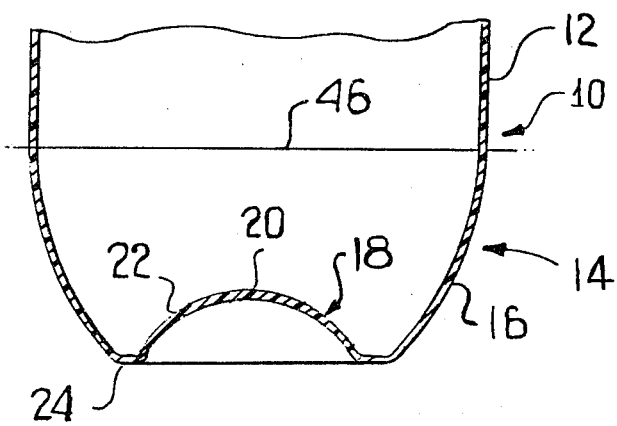
FIG. 1 is a vertical sectional view through the lower part of a prior art bottle of the type to which this invention relates.

Referring now to the drawings in detail, it will be seen that there is illustrated in FIG. 1 a plastic bottle having a champagne bottom, the bottle being generally identified by the numeral 10. The bottle 10 includes a generally cylindrical body 12 which terminates in a bottom structure 14. The bottom structure 14 includes a truncated hemispherical or ogival lower section 16. The central part of the bottom structure 14 at the base thereof includes a generally conical part 18 which includes a top apex 20 and a downwardly sloping conical wall section 22. The wall section 22 merges into an annulus or junction ring 24 which connects the conical part 18 to the truncated hemispherical section 16.

The bottom structure illustrated in FIG. 1 as prior art is ideally depicted to provide for a uniform wall thickness. Actually, in the prior art device there is a maximum thickness of the bottom structure in the area of the top apex 20 and there may be an undue thinning of the junction ring 24. The net result is that the bottom structure 14 is unduly weak as compared to the remainder of the bottle 10 and the conical portion 18 has a tendency to invert so that the bottom assumes an overall generally hemispherical cross section.

It will be readily apparent that any downward deformation of the conical portion 18 will result in an increase in the internal volume of the bottle with the resultant lowering of the level of the liquid within the bottle even though the volume of the contents of the bottle remains the same. It is therefore highly desirable that the bottom structure of the bottle 10 be rigidified so as to prevent this undesired distortion of the bottom structure.

Figure 4:
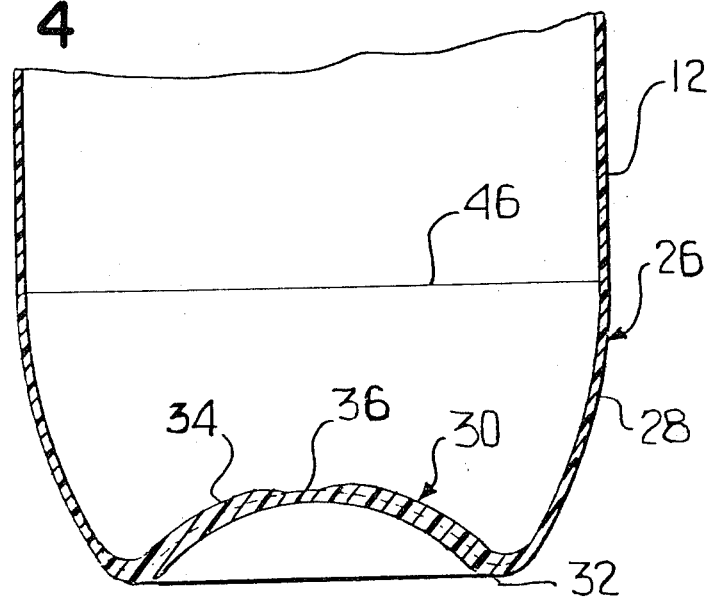
FIG. 4 is a sectional view similar to FIG. 1, and shows a modified bottom structure formed in accordance with this invention.

It has been proposed by applicants to strengthen the bottom structure 14 by forming the same with internal ribs which are in the form of thickened material disposed on the inner surface of the bottom structure. Such a modified bottom construction is illustrated in FIG. 4 and is generally identified by the numeral 26. The bottom structure 26, like the bottom structure 14, includes a truncated hemispherical upper portion 28, an internal conical portion 30, and a junction ring 32 joining the two. In addition, the bottom structure 26, particularly the conical portion 30 and the junction ring 32, is reinforced by circumferentially spaced radiating ribs 34 formed on the inner surface of the bottom structure 26, as is shown in FIG. 4. The ribs 34 extend generally from the outer periphery of the top apex 36 of the conical portion 30 and across the junction ring 32, terminating in the outer wall 28 as shown.

The addition of the ribs 30 per se is not the subject of this invention. This invention has to do with the advantageous results obtained through the provision of the ribs 30 in conjunction with the provision of a stretch rod axially to elongate the preform for the bottle. Most particularly, as will be specifically described hereinafter, it has been found that the mere provision of the ribs 30, together with the manner in which the preform for the bottle is worked upon, produces a much stronger bottom structure 26 than that which would be provided for by the addition of the ribs 34 alone.

Figure 2:
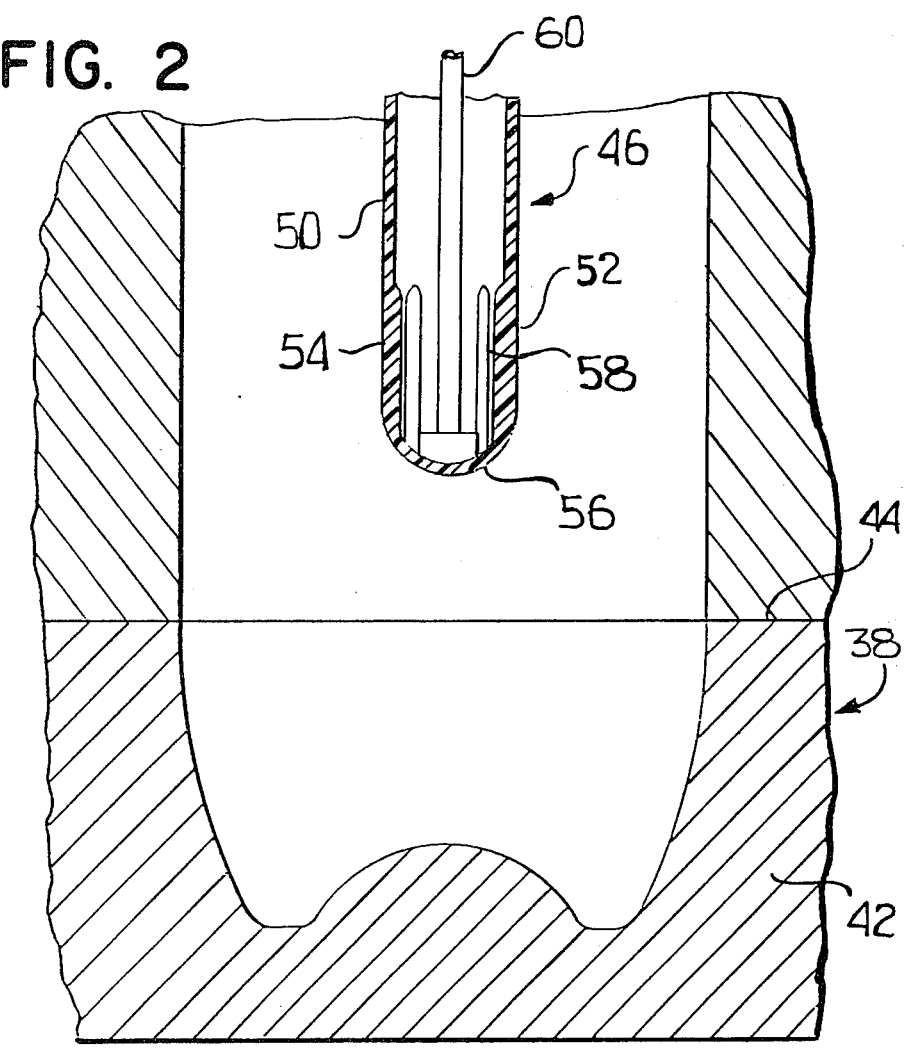
FIG. 2 is a fragmentary axial sectional view taken through a mold for molding a bottle of the type shown in FIG. 1, and having associated therewith a preform which is to be stretched and blown therein, the preform having incorporated therein bottom strengthening ribs.

Referring now to FIG. 2, it will be seen that there is illustrated a conventional blow mold generally identified by the numeral 38 for forming bottles such as that of FIGS. 1 and 4. The blow mold 38 includes an axially split body portion 40, a base portion 42, and a neck ring (not shown). The base section 42 defines the bottom structure of a bottle blow molded therein and the parting line 44 between the mold sections 40 and 42 is identifiable in the finished bottle in a flash line 46.

In FIG. 2 the mold 48 has illustrated therein a preform 48 from which the bottle of FIG. 4 is blown. The preform 48 has a tubular body portion 50 which terminates in a lower bottom forming portion 52. The bottom forming portion 52 also includes a generally tubular body 54, which forms a continuation of the body 50. The body portion 54 terminates in a hemispherical bottom 56.

Figure 3:
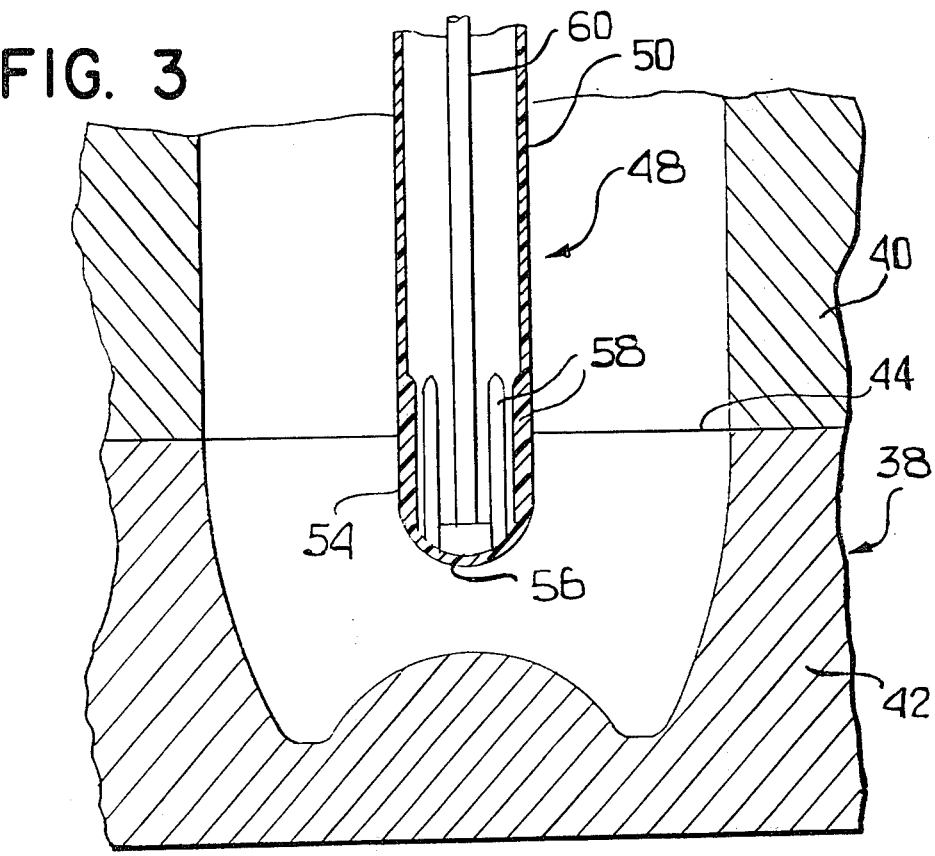
FIG. 3 is a sectional view similar to FIG. 2, and shows the preform axially stretched by means of a stretch rod and the thinning of the intermediate portion of the preform as a result of such stretching being exaggerated.

The preform 48 is injected molded and when molded is provided on the inner surface of the body portion 52 with a plurality of circumferentially spaced axially extending ribs 58 which flow into and terminate within the bottom 56. It will be seen that the preform 48 is of a length materially less than that of the cavity of the blow mold 38. Prior to the introduction of a gas under pressure into the preform 48 for effecting the blowing of the bottle, the preform 48 is axially stretched by means of a conventional stretch rod 60 as shown by a comparison of FIGS. 2 and 3. When the stretch rod 60 is elongated to effect the stretching of the preform 48, it has been found that instead of there being a uniform stretching of the preform 48 and a resultant uniform reduction of thickness of the overall body of the preform 48, when the body portion of the preform is reinforced by the ribs 58, the bottom forming portion of the preform 48 is stiffened and resists axial stretching with the result that the elongation of the preform 48 primarily is as a result of a stretching of the body portion 50. Thus the ribs 58 serve advantageously to reinforce the bottom forming portion of the preform and substantially eliminates stretching thereof during the stretching of the preform.

The net result is that when the preform is then blown within the mold 38, the bottom segment of the bottle, that is the portion of the bottle below the flash line 46, has thicker walls and is greatly strengthened in proportion to the amount of plastic material required for the ribs 58.

Most specifically, it has been found that in the formation of a 1 liter bottle where the bottom segment normally weighs between 12 and 13 grams, that the total weight of the added ribs 58 is on the order of ½ gram, the weight of the ribbed bottom section increases not from the 12-13 gram weight to the expected 12½-13½ gram weight, but to a 16-17 gram weight. In other words, the increase in weight of the bottom segment of the bottle is on the order of 4 grams for an increase of only ½ gram of plastic material. Further, the plastic material which has now been incorporated in the bottom structure of the bottle has been drawn from the body area of the bottle without a sacrifice in strength. In order words, by adding material in the form of ribs weighing approximately 4% of the bottom segment weight, the bottom segment weight is increased on the order of 33%, or on the order of 8 times the weight of the ribs. This is highly advantageous and provides for a very stiff, high strength bottom with a minimum of added plastic material.

Although only a preferred embodiment of the invention has been specifically illustrated and described herein, it is to be understood that minor variations may be made therein without departing from the spirit and scope of the invention as defined by the appended claims.

We claim:

1. A blow molded plastic bottle for beverages, said bottle being of the type including a tubular body portion and an integral bottom structure, said bottom structure including an internal axially inwardly directed generally conical part and a generally arcuate cross-sectional axially inwardly opening base ring, said bottom structure being improved by said generally conical part and said base ring being reinforced by a plurality of circumferentially spaced radially extending ribs integrally formed on the interior of both said generally conical part and said base ring and bridging said base ring and terminating in said bottom structure, and said ribs forming means resisting thinning of said generally conical part and said base ring during blow molding of said bottle and providing for a greater wall thickness of said generally conical part and said base ring between said ribs than in a like bottle formed in the same blow mold with the same preform but without ribs.

2. A bottle according to claim 1 wherein the weight of said bottom structure due to said greater wall thickness is increased on the order of 8 times the weight of said ribs.

3. A bottle according to claim 1 wherein said bottom structure also includes a truncated hemispherical outer portion joined to said base ring, and said ribs terminating in said outer portion.

4. A bottle according to claim 1 wherein there is a decrease in the wall thickness of said body portion as compared to a like bottle formed in the same blow mold with the same preform without ribs.

5. A bottle according to claim 1 wherein said ribs have radially inner ends terminating in radially spaced relation.

* * * * *